United States Patent
Veerasubramanian et al.

(10) Patent No.: US 10,447,842 B1
(45) Date of Patent: Oct. 15, 2019

(54) PUSH-TO-TALK TO MESSAGING APPLICATION GRAPHICAL INTERFACE

(71) Applicant: MOTOROLA SOLUTIONS, INC., Chicago, IL (US)

(72) Inventors: Veerapriya Veerasubramanian, Chicago, IL (US); Alexander R. Spiro, Chicago, IL (US); Yujing Su, Chicago, IL (US); Chun Wang, Oak Park, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/203,241

(22) Filed: Nov. 28, 2018

(51) Int. Cl.
*H04L 12/18* (2006.01)
*H04M 1/725* (2006.01)
*H04L 12/58* (2006.01)
*H04W 4/10* (2009.01)
*H04L 29/06* (2006.01)
*G06F 3/0488* (2013.01)

(52) U.S. Cl.
CPC .... *H04M 1/72547* (2013.01); *G06F 3/04886* (2013.01); *H04L 51/04* (2013.01); *H04L 51/16* (2013.01); *H04L 51/24* (2013.01); *H04L 65/4061* (2013.01); *H04W 4/10* (2013.01)

(58) Field of Classification Search
CPC ........... H04N 7/15; G10L 17/22; G10L 15/30; G06T 3/0093; H04M 1/7255; H04W 4/08; H04W 4/22; H04W 4/00; H04B 5/0006; H04L 51/046; H04L 51/16; G06F 3/0482; G06F 3/1454
USPC ............. 370/466; 455/466, 456, 3; 348/4.07
See application file for complete search history.

(56) References Cited

U.S. PATENT DOCUMENTS 8,533,611 B2 9/2013 Katis et al.
8,812,041 B2 * 8/2014 Lee .......................... H04W 4/10
455/517

(Continued)

OTHER PUBLICATIONS

Eschat, "Push-to-Talk for your Smartphone with Integrated Radio Interoperability," website (2014) 4 pages, https://www.eschat.com/.

(Continued)

*Primary Examiner* — Phuoc H Doan
(74) *Attorney, Agent, or Firm* — Michael Best & Friedrich LLP

(57) ABSTRACT

A method and device for performing push-to-talk and text communications. The device includes a display and an electronic processor communicatively coupled to the display. The electronic processor is configured to generate a graphical user interface, generate, on the display, a first push-to-talk button having a first dimension and located proximate to a conversation thread window including a historical view portion and a new-entry portion, and receive, on the display, a first user input selecting the new-entry portion. The electronic processor is further configured to generate on the display, in response to receiving the first user input, a text-entry portion, replace, in response to receiving the first user input, the first push-to-talk button with a second push-to-talk button at a same or different first location, receive, via the display, a second user input selecting the text-entry portion, and alter, in response to the second user input, the second push-to-talk button.

16 Claims, 8 Drawing Sheets

(56) References Cited

U.S. PATENT DOCUMENTS

| | | |
|---|---|---|
| 8,948,804 B2 | 2/2015 | Lee et al. |
| 9,054,912 B2 | 6/2015 | Katis et al. |
| 9,055,421 B2 | 6/2015 | Bridge et al. |
| 9,113,315 B2 | 8/2015 | Talwar et al. |
| 9,148,397 B2 | 9/2015 | Talwar et al. |
| 9,374,690 B2 | 6/2016 | Talwar et al. |
| 9,749,462 B2 | 8/2017 | Bridge et al. |
| 2010/0166159 A1 | 7/2010 | Katis et al. |
| 2014/0331150 A1* | 11/2014 | Griffin ................ H04L 12/1827 715/758 |
| 2014/0343937 A1 | 11/2014 | Katis et al. |

OTHER PUBLICATIONS

Zello Incorporated, "Fast, reliable push-to-talk for work teams," website (2018) 4 pages, https://zello.com/work/.
Apple Store, "AT&T Enhanced Push-to-Talk," website (2014) 3 pages, https://itunes.apple.com/ca/app/at-t-enhanced-push-to-talk/id621010564?mt=8_.
Whatsapp Incorporated, "Simple, Secure, Reliable messaging," website (2018) 2 pages, https://www.whatsapp.com/.

* cited by examiner

PUSH-TO-TALK TO MESSAGING APPLICATION GRAPHICAL INTERFACE

BACKGROUND OF THE INVENTION

Public safety personnel (for example, police, fire fighters, first responders, investigators, and the like) use electronic communication devices to communicate with one another during the performance of their duties using a variety of communication modalities. One known communication modality is text messaging. Some communication devices provide text messaging. Some communication devices provide push-to-talk functionality. Push-to-talk (PTT) is a communication modality involving transmitting audio communications over a half-duplex communication channel. PTT is used in voice communications between police officers, first responders, and the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
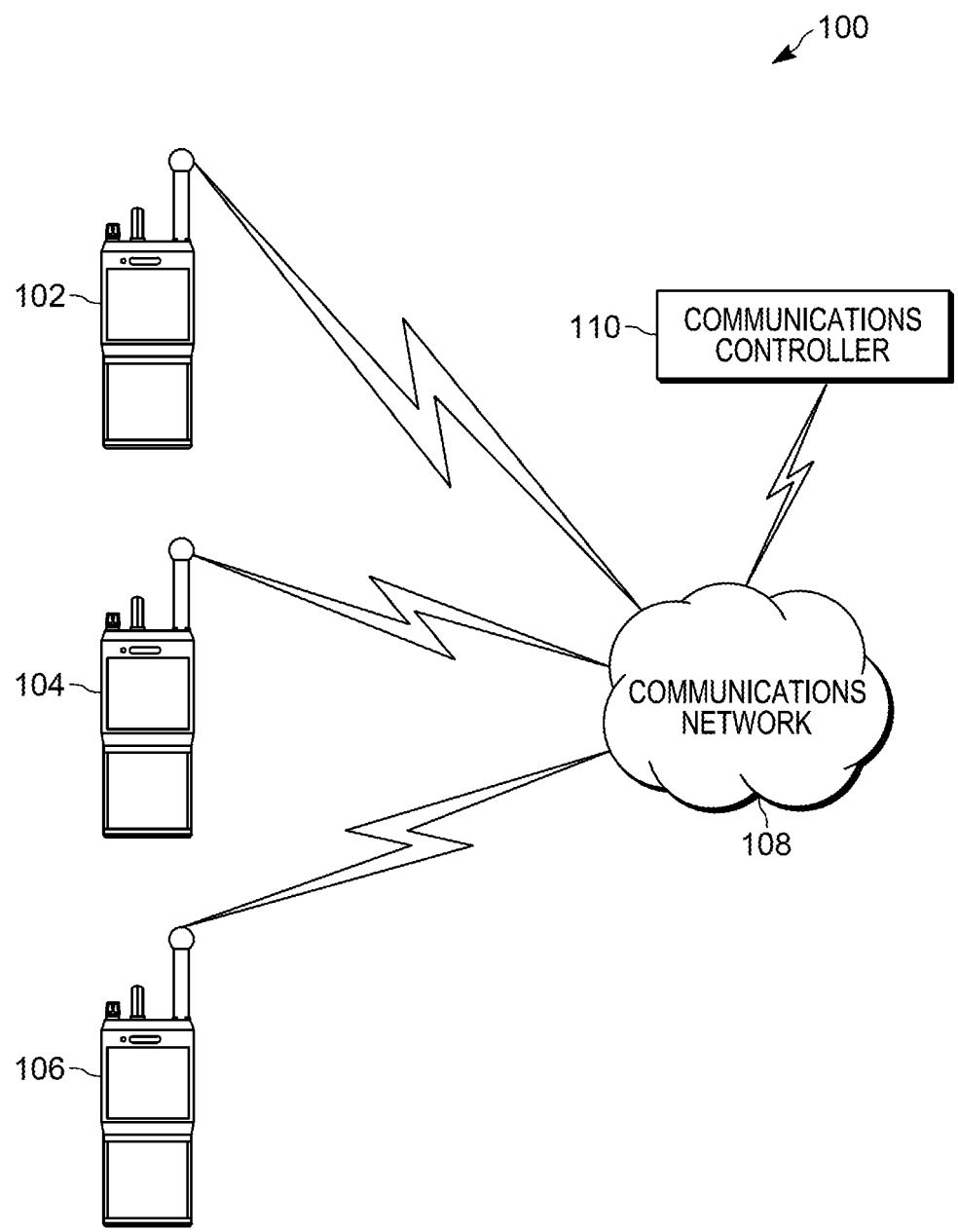
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Communication devices, including, for example, mobile telephones and converged radio devices, may be configured to provide a user with more than one type of communication modality. For example, a communication device may provide both text messaging and PTT communications, for example, via software applications running on the communication device. In some circumstances, a public safety officer may need to conduct a PTT call while communicating with another public safety officer via text messaging. The user may not have the time or find it difficult to switch between a text messaging application and a PTT application.

Accordingly, systems and methods described herein provide, among other things, a graphical user interface for simple transition between text messaging and PTT communications.

One example embodiment provides a device. The device includes a display and an electronic processor communicatively coupled to the display. The electronic processor is configured to generate a graphical user interface, generate, on the display, a first push-to-talk button having a first dimension and located proximate to a conversation thread window including a historical view portion and a new-entry portion, and receive, on the display, a first user input selecting the new-entry portion. The electronic processor is further configured to generate on the display, in response to receiving the first user input, a text-entry portion, replace, in response to receiving the first user input, the first push-to-talk button with a second push-to-talk button at a same or different first location, receive, via the display, a second user input selecting the text-entry portion, and alter, in response to the second user input, the second push-to-talk button.

Another example embodiment provides a method of operating a communication device configured to perform push-to-talk and text communications. The method includes generating, on a display, a graphical user interface, generating, on the display, a first push-to-talk button having a first dimension and located proximate to a conversation thread window including a historical view portion and a new-entry portion, and receiving, on the display, a first user input selecting the new-entry portion. The method further includes generating on the display, in response to receiving the first user input, a text-entry portion, replacing, in response to receiving the first user input, the first push-to-talk button with a second push-to-talk button at a same or different first location, receiving, via the display, a second user input selecting the text-entry portion, and altering, in response to the second user input, the second push-to-talk button.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. For example, although the examples described herein are in terms of switching between a PTT modality and a text messaging modality, in further embodiments, the methods described herein may be applied to different communication modalities (for example, email messaging and cellular communications).

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a diagram of a communication system 100 according to one example. In the example shown, the communication system 100 includes electronic communication devices 102, 104, and 106. In the following description, when explaining how a single electronic communication device functions, a reference to electronic communication device 102 is used. The electronic communication devices 104 and 106 may be configured similarly. It is not necessary, however, that the electronic communication devices 102, 104, and 106 be identical. The electronic communication devices of the communication system 100 are merely examples. In some embodiments, the communication system 100 may include more or fewer communication devices than illustrated in FIG. 1.

The electronic communication devices 102, 104, and 106 communicate with each other over a communication network 108. The network 108 may be a wireless communication network. All or parts of the network 108 may be implemented using various existing networks, for example, a cellular network, the Internet, a land mobile radio (LMR) network, a Bluetooth™ network, a wireless local area network (for example, Wi-Fi), a wireless accessory Personal Area Networks (PAN), a Machine-to-machine (M2M) autonomous network, and a public switched telephone network. The network 108 may also include future developed networks. In some embodiments, the network 108 may also include a combination of the networks mentioned.

In some embodiments, each of the electronic communication devices 102, 104, and 106 is associated with one or more talk groups. As used herein, a talk group is a defined group of communication devices that share communications with each other via one or more communication modalities. For example, each of the communication devices of a talk group may be part of an established text messaging group, a PTT call group, or both.

A talk group may be defined or assigned based on various criteria. For example, a talk group may be established for devices associated with a particular public safety organization or department, a particular incident, a particular member role or designation, or a combination thereof. For example, a talk group may relate to an organization of first responders, a group of police officers, a fire incident, or a combination thereof. Similarly, a talk group may relate to members having the same role or designation (for example, police officer, detective, supervisor, paramedic, firefighter, and the like). As another example, paramedics and firefighters might be grouped into two different talk groups even though they are responding to the same public safety incident.

The talk groups and communications therebetween may be managed by a communications controller 110. The communications controller 110 may be a server that is computer maintained, for example, at a call center or public safety command center. The communications controller 110 may control communication between the devices 102, 104, and 106 over the network 108 in accordance with talk group affiliation (for example, PTT communications). In some embodiments, the system 100 includes more than one communications controller. Alternatively, in some embodiments one or more of the communication devices of the system 100 may be configured to manage and monitor one or more talk groups and communications thereof.

The electronic communication device 102 (described in more detail below in regard to FIG. 2) may be a handheld communication device, for example, a mobile telephone or other portable communication device, smart watch or other smart wearable, or other device configured to communicate over the network 108. In the illustrated embodiment, the communication device 102 is configured to communicate via text messaging and PTT communications. In some embodiments, the electronic communication device 102 may be distributed over more than one device. For example, the communication device 102 may be a portable touchscreen display device paired to a portable/handheld radio carried by a public safety officer or first responder, such as a police officer via a personal area network (for example, via a Bluetooth network, Zigbee network, and other network or connection). In some embodiments, the electronic communication device 102 is a mobile communication device mounted in or on a vehicle (for example, a police vehicle). In some embodiments, the electronic communication device 102 may be a device maintained, for example, at a call center or public safety command center.

Figure 2:
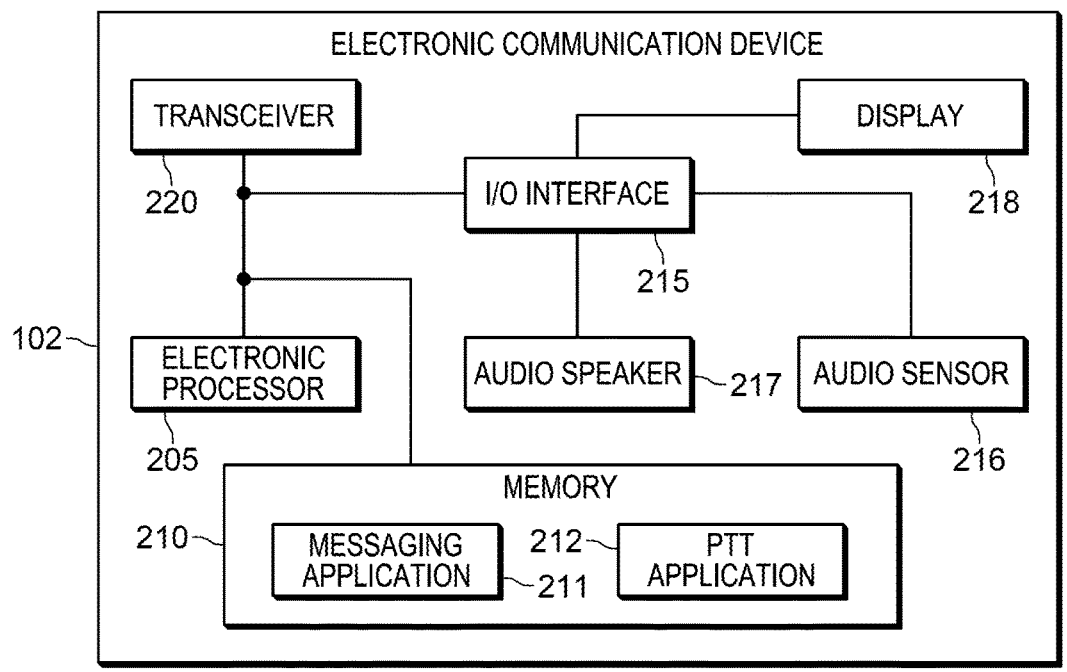
FIG. 2 is a block diagram of an electronic communication device included in the communication system of FIG. 1 in accordance with some embodiments.

FIG. 2 is a block diagram of a communication device 102. In the example shown, the communication device 102 includes an electronic processor 205, a memory 210, an input/output interface 215, an audio sensor 216, an audio speaker 217, a display 218, and a transceiver 220. The illustrated components, along with other various modules and components are coupled to each other by or through one or more connections including, for example, control or data buses that enable communication therebetween. The use of control and data buses for the interconnection between and exchange of information among the various modules and components would be apparent to a person skilled in the art in view of the description provided herein.

The electronic processor 205 obtains and provides information (for example, from the memory 210 and/or the input/output interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein.

The memory 210 can include one or more non-transitory computer-readable media, and includes a program storage area and a data storage area. The program storage area and the data storage area can include combinations of different types of memory, as described herein. The memory 210 may take the form of any non-transitory computer-readable medium. In the embodiment illustrated, the memory 210 stores, among other things, one or more applications. Each of the applications are configured to perform a particular function and/or provide access to features of the device when executed by the electronic processor 205. Functions and features include, for example, texting, audio communications, retrieving and displaying information from a public and/or private database (for example, weather, dispatch control, etc.), video/camera capture, and the like. In the illustrated embodiment, the memory includes a text messaging application 211 and a PTT application 212. The text messaging application 211 may be, for example, a messaging application that provides features to support the composition and sending of electronic messages that include alphabetic and numeric characters, for example, a cellular text messaging application, an instant messaging application, and the like. The PTT application 212 is an application that provides features to support the reception and transmission of PTT calls. Such calls may be one-to-one calls or group calls and may be transmitted over cellular networks, data networks, radio networks and the like (for example, those described above in regard to the transceiver 220). In some embodiments, the text messaging application 211 and the PTT application 212 are integrated together in a single application.

The input/output interface 215 is configured to receive input and to provide system output. The input/output interface 215 obtains information and signals from, and provides information and signals to (for example, over one or more wired and/or wireless connections) devices both internal and external to the communication device 102, for example, the display 218. The display 218 may be, for example, a liquid crystal display (LCD) touch screen, or an organic light-emitting diode (OLED) touch screen. Output may also be provided via the audio speaker 217. The audio speaker 217 is a transducer that produces sound from electrical signals (for example, generated from an audio stream) received from the electronic processor 205. Alternative embodiments may include additional output mechanisms, for example, haptic feedback motors and light sources (not shown). Input may be provided via the audio sensor 216. The audio sensor 216 is configured to capture audio. The audio sensor 216 may be, for example, a microphone. Input may also be provided, for example, via a keypad, soft keys, icons, or soft buttons on the display, a scroll ball, buttons, and the like. The input/output interface 215 includes a graphical user interface (GUI) (for example, generated by the electronic processor 205, from instructions and data stored in the memory 210, and presented on the display 218) that enables a user to interact with the communication device 102.

The transceiver 220 is configured for wireless coupling to wireless networks (for example, land mobile radio (LMR) networks, Long Term Evolution (LTE) networks, Global System for Mobile Communications (or Groupe Special Mobile (GSM)) networks, Code Division Multiple Access (CDMA) networks, Evolution-Data Optimized (EV-DO) networks, Enhanced Data Rates for GSM Evolution (EDGE) networks, 3G networks, 4G networks, combinations or derivatives thereof, and other suitable networks, including future-developed networks. Alternatively, or in addition, the electronic communication device 102 may include a connector or port (not shown) for receiving a connection to a wired network (for example, Ethernet). The electronic processor 205 is configured to operate the transceiver 220 to receive input from and to provide system output, or a combination of both. The transceiver 220 obtains information and signals from, and provides information and signals to, (for example, over one or more wired and/or wireless connections) devices (including, in some embodiments, from the communication controller) both internal and external to the electronic communication device 102.

The electronic processor 205 obtains and provides information (for example, from the memory 210 and/or the transceiver 220), and processes the information by executing one or more software instructions or modules, capable of being stored, for example, in a random access memory ("RAM") area of the memory 204 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein.

Figure 3:
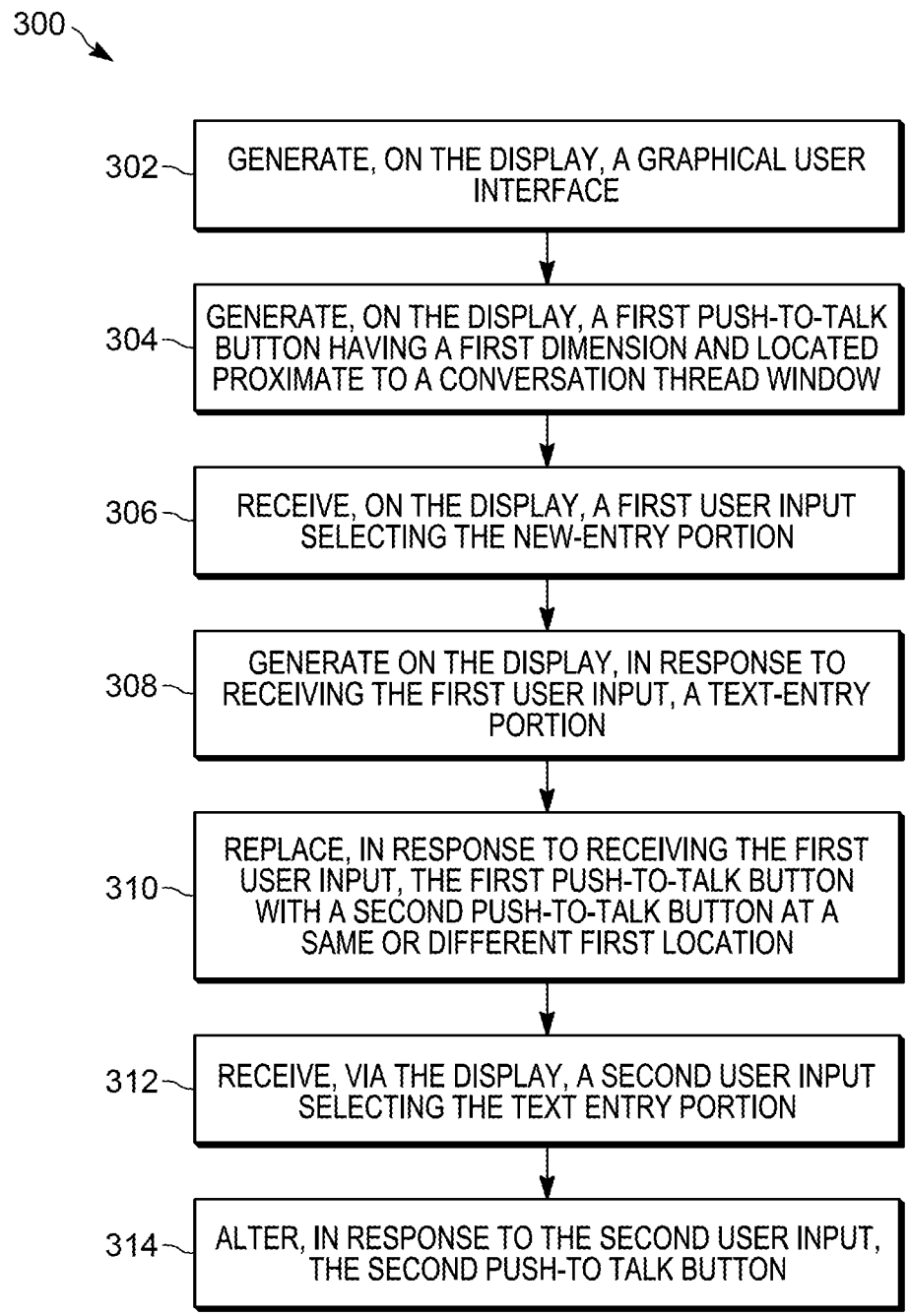
FIG. 3 is flowchart illustrating a method implemented by the electronic communication device of FIG. 2 for operating a communication device configured to perform push-to-talk and text communications in accordance with some embodiments.

FIG. 3 is a flowchart illustrating an example method 300 of operating a communication device configured to perform push-to-talk and text communications. As an example, the method 300 is described as being performed by the electronic communication device 102 and, in particular, the electronic processor 205. However, it should be understood that in some embodiments, portions of the method 300 may be performed by other devices, including, for example, the communications controller 110.

Figure 4A:
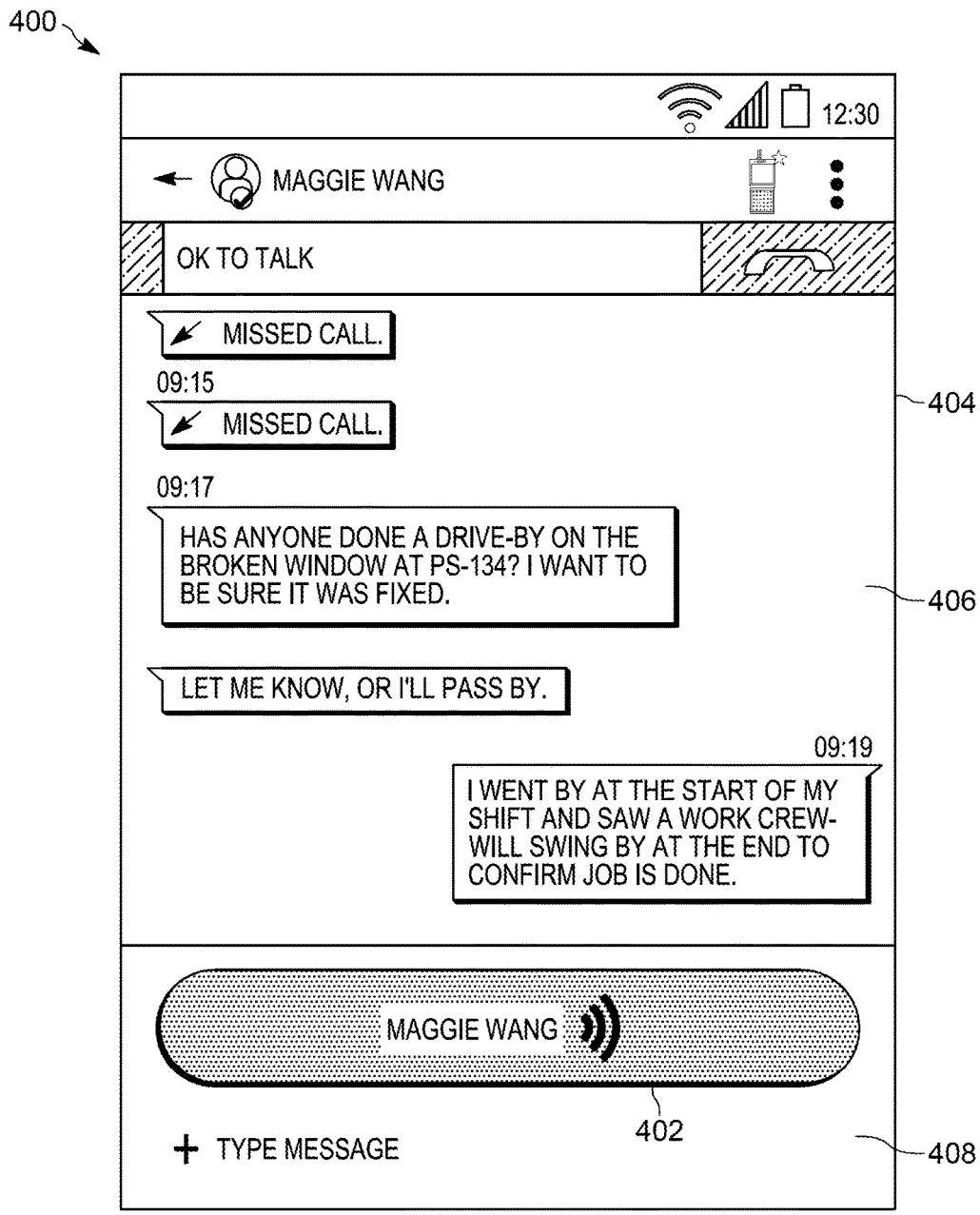
FIG. 4A is a graphical display of the communication device of FIG. 2 performing the method of FIG. 3 in accordance to some embodiments.

At block 302, the electronic processor 205 generates, on the display 218, a graphical user interface. At block 304, the electronic processor 205 generates, on the display, a first push-to-talk button. FIG. 4A illustrates a graphical user interface 400 displayed on the display 218 including the first push-to-talk-button 402. In the illustrated embodiment, the first push-to-talk button 402 is located proximate to a conversation thread window 404 of a graphical user interface of a text messaging application (for example, the text messaging application 211). In particular, the first push-to-talk button 402 overlays (completely or partially) the window 404. In the illustrated embodiment, the conversation thread window 404 includes a historical view portion 406 and a new-entry portion 408. The historical view portion 406 includes text messages previously received and transmitted from one or more electronic communication devices of the text messaging group. For example, in the illustrated embodiment, the text messaging group may include the electronic communication devices 102 and 104. The new-entry portion 408 is a graphical selection mechanism for creating a new text message to the participants of the text message group.

The first push-to-talk button 402 may be provided by a PTT application of the device 102 (for example, the PTT application 212). The first push-to-talk button 402, when activated by a user, causes the device 102 to transmit audio sensed by the audio sensor 216 as PTT call to one or more communication devices (for example the communication devices of the text message group, of a predetermined talkgroup, a combination thereof, and the like). In some embodiments, the interface 400 further provides audio of a PTT call from another communication device (for example, the communication device 104 or 106) to the device 102 through the speaker 217. In such embodiments, while the device 102 receives PTT audio (in other words, the transmitting communication device has the PTT floor), the first push-to-talk button 402 may not transmit audio when active until the user has forfeited the PTT floor.

Figure 4B:
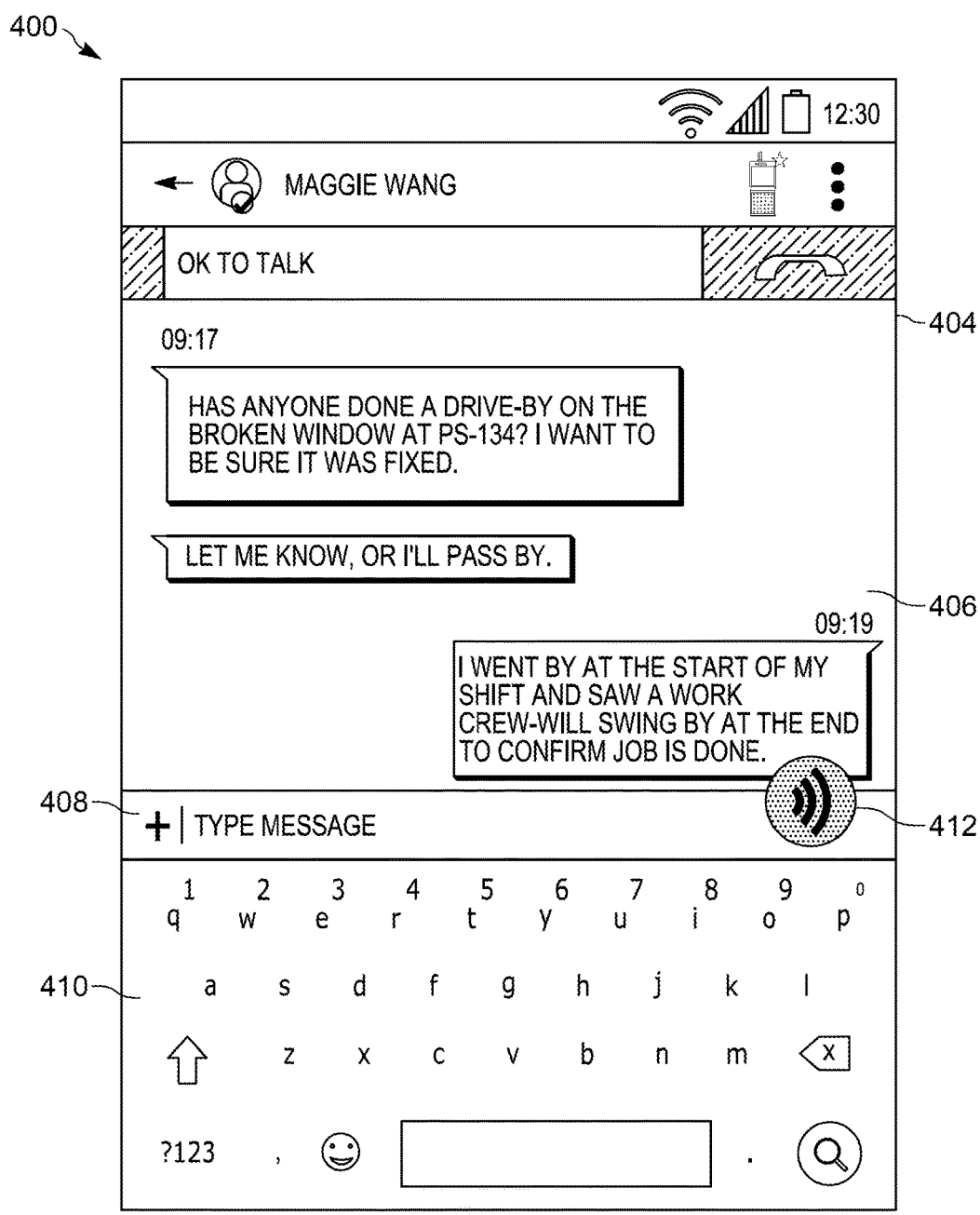
FIG. 4B is a graphical display of the communication device of FIG. 2 performing the method of FIG. 3 in accordance to some embodiments.

Returning to FIG. 3, at block 306 the electronic processor 205 receives, on the display 218, a first user input selecting the new-entry portion 408 (in other words, a user input indicative of a request to compose a new text message) and, at block 308, generates on the display, in response to receiving the first user input, a text-entry portion. The text-entry portion is an input interface for composing a text message. For example, FIG. 4B illustrates the interface 400 including a text-entry portion 410. In the illustrated embodiment, the text-entry portion 410 includes a graphical keyboard. In some embodiments, the text-entry portion 410 may alternatively be a sound-to-text prompt. In those embodiments, the electronic processor 205 is configured to utilize sound-to-text functionality to compose the text message (for example, using audio sensor 216 and speech-to-text software).

Returning to FIG. 3, at block 310, the electronic processor 205 replaces, in response to receiving the first user input, the first push-to-talk button 402 with a second push-to-talk button. The second push-to-talk button provides the same functionality as the first push-to-talk button 402 described above. The second push-to-talk button is positioned at a same or different location as the first push-to-talk button 402. The interface 400 illustrated in FIG. 4B includes a second push-to-talk button 412. In the illustrated embodiment, the second push-to-talk button 412 overlays the new-entry portion 408. It should be understood that, in other embodiments, the second push-to-talk button may be located at a different location on the display 218. In some embodiments, the dimension of the second push-to-talk button 412 may be different from the first push-to-talk button 402. In some embodiments, (for example, as illustrated in FIGS. 4A and 4B), the second push-to-talk button has a second dimension smaller than the first dimension. This allows a user to utilize the text-entry portion 410 without graphical obstruction from the second push-to-talk button 412. This particular configuration of the second push-to-talk button 412 make the second push-to-talk button 412 readily available while the user is composing a text message while not obstructing a user's ability to compose the text message.

Returning to FIG. 3, at block 312, the electronic processor 205 receives, on the display 218, a second user input selecting the text-entry portion 410. In this example, the second user input is text input. Text input is a selection or indication of alphabetic or numeric characters for the text message. Alternatively, in embodiments where the text-entry portion 410 is a voice-to-text prompt, the text input is the selection of the voice-to-text prompt. The electronic processor 205 then generates text corresponding to the particular text input within a text editing portion (for example, based on characters selected or a conversion of speech to text). In the embodiments illustrated in FIGS. 4A-D, the text editing portion is integrated into the new-entry portion 408.

Figure 4C:
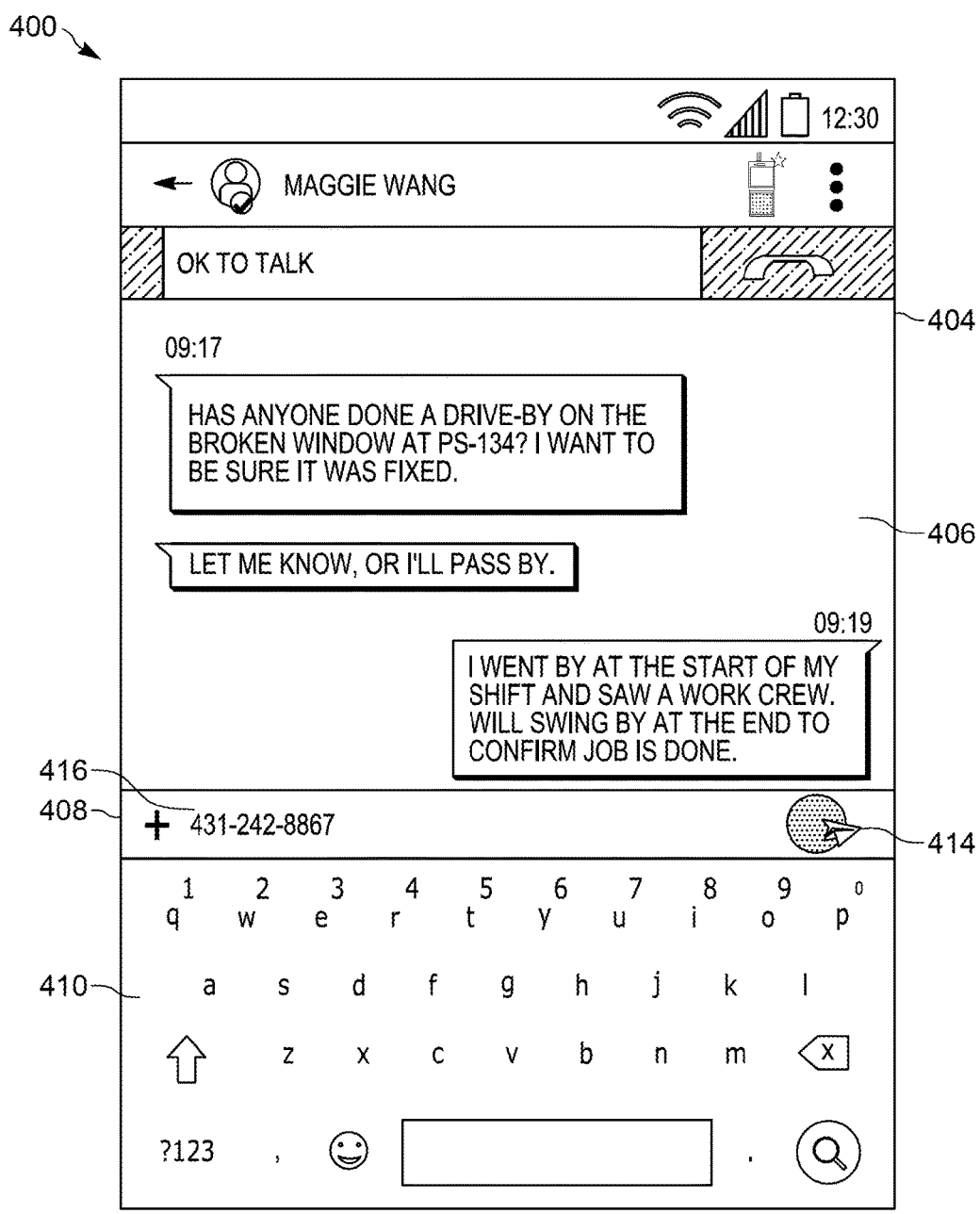
FIG. 4C is a graphical display of the communication device of FIG. 2 performing the method of FIG. 3 in accordance to some embodiments.

At block 314, in response to receiving the second user input, the electronic processor 205 alters (either a location, an appearance, or both of) the second push-to-talk button 412. In some embodiments, altering the second push-to-talk button 412 includes removing the second push-to-talk button 412 from the display 218 (in particular, the graphical display of the interface 400). For example, FIG. 4C illustrates the graphical user interface 400 with the second push-to-talk button 412 removed from the display 218. In the illustrated embodiment, the second push-to-talk button 412 is replaced with a send message button 414. When a user selects the send message button 414, the text (for example, the text 416) within the text editing portion (in the illustrated embodiment, the new-entry portion 408) is transmitted as a text message to the communication devices of the text messaging group.

The electronic processor 205 may redisplay the hidden second push-to-talk button 412 while there is text within the text editing portion. For example, the electronic processor 205 may redisplay the second push-to-talk button 412 in response to receiving a particular user input (for example, a swipe on the display 218 over the text-entry portion 410, a touch on the display 218 outside of the text-entry-portion 410, and the like). In some embodiments, the second push-to-talk button 412 may be redisplayed after the electronic processor 205 detects no additional user input for a predetermined period of time.

Figure 4D:
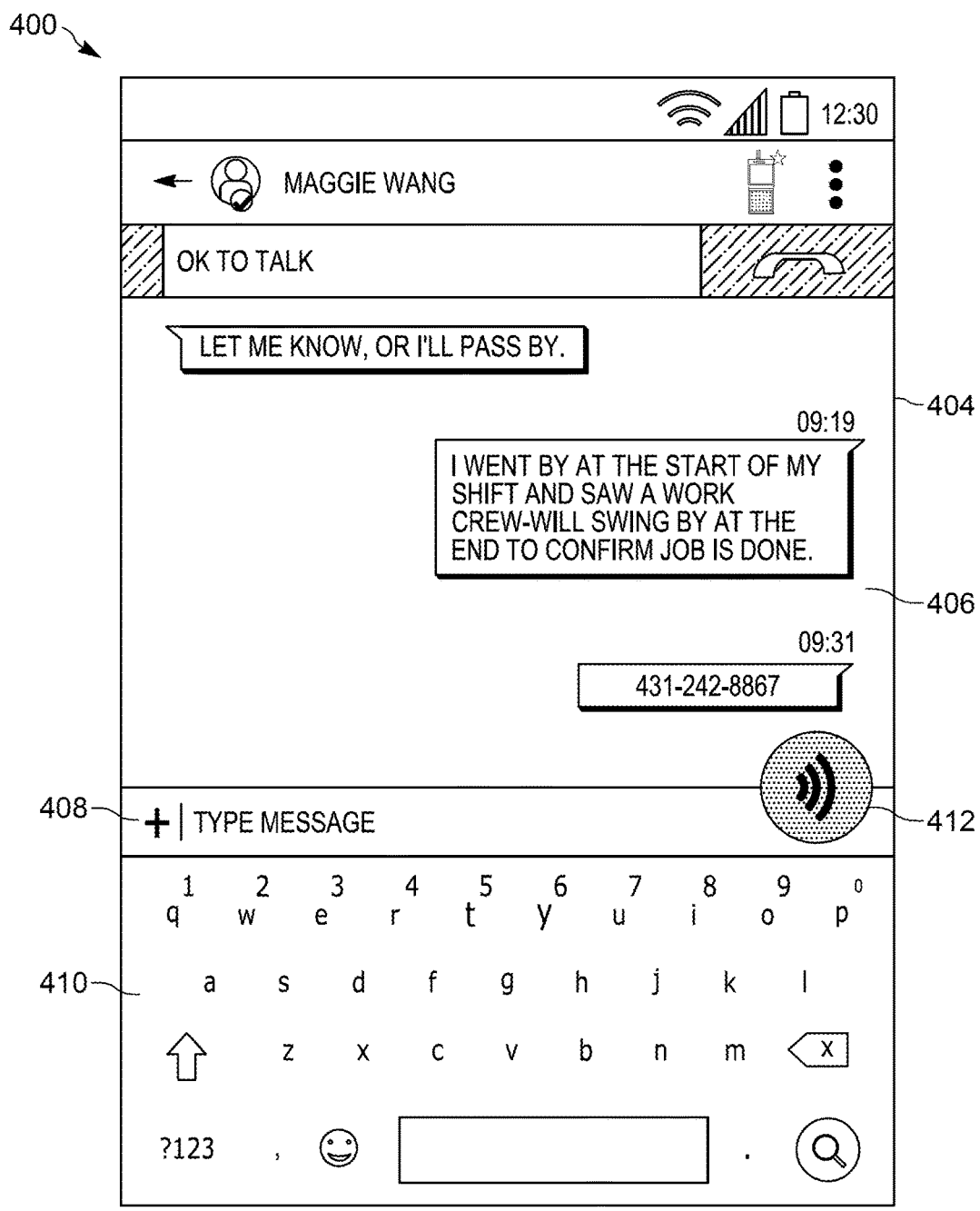
FIG. 4D is a graphical display of the communication device of FIG. 2 performing the method of FIG. 3 in accordance to some embodiments.

In the illustrated embodiment, the electronic processor 205 redisplays the second push-to-talk button 412 by replacing the send message button 414 with the second push-to-talk button 412. For example, as shown in FIG. 4D, the electronic processor 205 replaces the send message button 414 (of FIG. 4C) with the second push-to-talk button 412, in response to receiving a user input on the send message button 414 to send the text 416. In some embodiments, the electronic processor 205 may redisplay the first push-to-talk button 402 instead of the second push-to-talk button 412, similar to the interface 400 of FIG. 4A. In another example, the electronic processor 205 replaces the send message button 414 with the second push-to-text button 412 in response to receiving a user input on the historical view portion 406.

Figure 5:
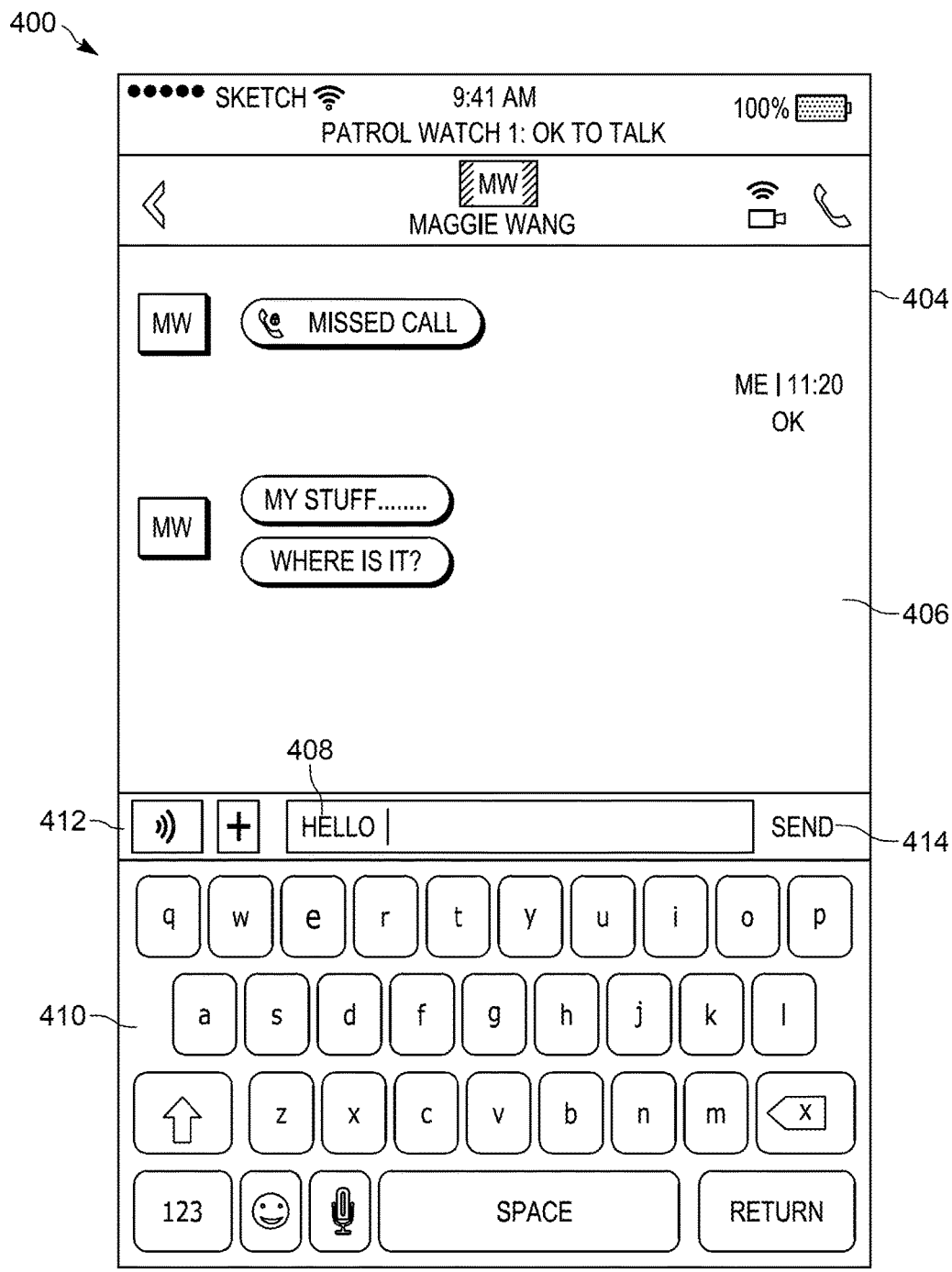
FIG. 5 is a graphical display of the communication device of FIG. 2 performing the method of FIG. 3 in accordance to some embodiments.

In some embodiments, altering the second push-to-talk button 412 includes relocating the second push-to-talk button, affecting a dimension of the second push-to-talk button, or both. For example, as illustrated in FIG. 5, the second push-to-talk button 412 is positioned opposite to the send message button 414. In such embodiments, the second push-to-talk button 412 remains on the display 218 while a user is composing a text message.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A communication device including:
a display;
an electronic processor communicatively coupled to the display, the electronic processor is configured to:
generate, on the display, a graphical user interface;
generate, on the display, a first push-to-talk button having a first dimension and located proximate to a conversation thread window including a historical view portion and a new-entry portion;
receive, on the display, a first user input selecting the new-entry portion;
generate on the display, in response to receiving the first user input, a text-entry portion;
replace, in response to receiving the first user input, the first push-to-talk button with a second push-to-talk button at a same or different first location;
receive, via the display, a second user input selecting the text-entry portion; and
alter, in response to the second user input, the second push-to-talk button.

2. The communication device of claim 1, wherein altering the second push-to-talk button includes at least one selected from the group consisting of relocating the second push-to-talk button on the display or affecting a dimension of the second push-to-talk button.

3. The communication device of claim 1, wherein altering the second push-to-talk button includes removing the second push-to-talk button from the display.

4. The communication device of claim 3, wherein removing the second push-to-talk button from the display includes replacing, the second push-to-talk button, with a send message button.

5. The communication device of claim 4, wherein the electronic processor is further configured to
receive, on the display, a third user input, selecting a send message button, and
replacing, in response to the third user input, the send message button with the second push-to-talk button.

6. The communication device of claim 3, wherein the electronic processor is further configured to
receive, on the display, a third user input indicative of requesting to engage in a push-to-talk communication, and
redisplaying on the display, in response to the third user input, either the first push-to-talk button or the second push-to-talk button.

7. The communication device of claim 1, wherein the second push-to-talk button has a second dimension smaller than the first dimension.

8. The communication device of claim 1, wherein the text-entry portion is a graphical keyboard or voice-to-text prompt.

9. A method of operating a communication device configured to perform push-to-talk and text communications, the method comprising:
generating, on a display, a graphical user interface;
generating, on the display, a first push-to-talk button having a first dimension and located proximate to a conversation thread window including a historical view portion and a new-entry portion;
receiving, on the display, a first user input selecting the new-entry portion;
generating on the display, in response to receiving the first user input, a text-entry portion;
replacing, in response to receiving the first user input, the first push-to-talk button with a second push-to-talk button at a same or different first location;
receiving, via the display, a second user input selecting the text-entry portion; and
altering, in response to the second user input, the second push-to-talk button.

10. The method of claim 9, wherein altering the second push-to-talk button includes at least one selected from the group consisting of relocating the second push-to-talk button or affecting a dimension of the second push-to-talk button.

11. The method of claim 9, wherein altering the second push-to-talk button includes removing the second push-to-talk button from the display.

12. The method of claim 11, wherein removing the second push-to-talk button from the display includes replacing, the second push-to-talk button, with a send message button.

13. The method of claim 12, wherein the electronic processor is further configured to
- receive, on the display, a third user input, selecting a send message button, and
- replacing, in response to the third user input, the send message button with the second push-to-talk button.

14. The method of claim 12, wherein the electronic processor is further configured to
- receive, on the display, a third user input indicative of requesting to engage in a push-to-talk communication, and
- redisplaying on the display, in response to the third user input, either the first push-to-talk button or the second push-to-talk button.

15. The method of claim 9, wherein the second push-to-talk button has a second dimension smaller than the first dimension.

16. The method of claim 9, wherein the text-entry portion is a graphical keyboard or voice-to-text prompt.

\* \* \* \* \*